(12) United States Patent
Kwon et al.

(10) Patent No.: US 10,031,746 B2
(45) Date of Patent: *Jul. 24, 2018

(54) ANALYZING COMPONENTS RELATED TO A SOFTWARE APPLICATION IN A SOFTWARE DEVELOPMENT ENVIRONMENT

(71) Applicant: Blue Wolf Group, LLC, New York, NY (US)

(72) Inventors: Tae Yol Jon Kwon, New York, NY (US); Louis Fox, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/099,219

(22) Filed: Apr. 14, 2016

(65) Prior Publication Data

US 2016/0224338 A1 Aug. 4, 2016

Related U.S. Application Data

(63) Continuation of application No. 14/573,497, filed on Dec. 17, 2014, now Pat. No. 9,342,300.

(60) Provisional application No. 62/064,891, filed on Oct. 16, 2014, provisional application No. 61/951,101, filed on Mar. 11, 2014.

(51) Int. Cl.
 G06F 8/71 (2018.01)
 G06F 8/74 (2018.01)
 G06F 8/41 (2018.01)

(52) U.S. Cl.
 CPC .................. G06F 8/71 (2013.01); G06F 8/74 (2013.01); *G06F 8/427* (2013.01)

(58) Field of Classification Search
 None
 See application file for complete search history.

(56) References Cited

U.S. PATENT DOCUMENTS

| 6,083,276 | A | * | 7/2000 | Davidson | G06F 8/30 709/200 |
| 7,305,671 | B2 | * | 12/2007 | Davidov | G06F 8/30 717/108 |

(Continued)

FOREIGN PATENT DOCUMENTS

| EP | 1571547 | 9/2005 |
| EP | 2184903 | 5/2010 |

OTHER PUBLICATIONS

Jean, M. and Rosenblum, D., "Engineering Distributed Objects" in Lecter Notes in Computer Science, vol. 1999, 2001, pp. 129-144.

*Primary Examiner* — Isaac T Tecklu
(74) *Attorney, Agent, or Firm* — Brian Restauro; Andrew M. Calderon; Roberts Mlotkowski Safran Cole & Calderon, P.C.

(57) ABSTRACT

According to one aspect of the present disclosure, a process for analyzing components related to a software application in a software development environment is disclosed. The process includes obtaining metadata information for each of a plurality of components from the software development environment, and generating an entry including extracting attribute information from the obtained metadata information for each component for use by a developer of the software application.

17 Claims, 11 Drawing Sheets

(56) References Cited

U.S. PATENT DOCUMENTS

| | | | |
|---|---|---|---|
| 7,346,889 B1* | 3/2008 | Semenov | G06F 8/51 717/106 |
| 7,373,632 B1* | 5/2008 | Kawaguchi | G06F 9/465 709/203 |
| 7,720,209 B2 | 5/2010 | Ovsyannikov et al. | |
| 7,793,255 B1* | 9/2010 | Kawaguchi | G06F 8/24 717/100 |
| 7,870,540 B2* | 1/2011 | Zare | G06F 11/3604 717/109 |
| 8,095,911 B2 | 1/2012 | Ronen et al. | |
| 8,271,974 B2 | 9/2012 | Mazhar et al. | |
| 8,359,572 B2 | 1/2013 | Mital et al. | |
| 8,713,530 B2 | 4/2014 | Waite et al. | |
| 8,745,572 B2 | 6/2014 | Zimmermann et al. | |
| 8,918,439 B2 | 12/2014 | Alatorre et al. | |
| 8,966,498 B2 | 2/2015 | Maes | |
| 9,003,362 B2 | 4/2015 | Lam | |
| 2002/0073091 A1 | 6/2002 | Jain et al. | |
| 2002/0108101 A1* | 8/2002 | Charisius | G06F 8/20 717/105 |
| 2003/0163603 A1* | 8/2003 | Fry | G06F 8/427 719/328 |
| 2004/0054688 A1 | 3/2004 | Tran | |
| 2005/0132339 A1* | 6/2005 | Maron | G06F 8/315 717/136 |
| 2005/0171910 A1 | 8/2005 | Wu et al. | |
| 2005/0235275 A1* | 10/2005 | Betts | G06F 8/51 717/136 |
| 2005/0278358 A1* | 12/2005 | Doughan | G06F 17/30914 |
| 2005/0278622 A1* | 12/2005 | Betts | G06F 17/30893 715/234 |
| 2006/0149408 A1* | 7/2006 | Speeter | G06F 8/71 700/126 |
| 2007/0044069 A1* | 2/2007 | Doucette | G06F 8/30 717/106 |
| 2009/0204943 A1* | 8/2009 | Konduri | G06F 8/51 717/114 |
| 2010/0198960 A1 | 8/2010 | Kirschnick et al. | |
| 2010/0325169 A1* | 12/2010 | Loh | G06F 17/30911 707/803 |
| 2011/0154441 A1 | 6/2011 | Oh et al. | |
| 2011/0184990 A1* | 7/2011 | Murphy | G06F 8/20 707/791 |
| 2011/0271263 A1 | 11/2011 | Archer et al. | |
| 2012/0303640 A1* | 11/2012 | Chamarthy | G06F 17/272 707/755 |
| 2012/0324069 A1 | 12/2012 | Nori et al. | |
| 2013/0151317 A1 | 6/2013 | Charfi et al. | |
| 2014/0089332 A1* | 3/2014 | Maharana | G06F 17/30917 707/755 |

\* cited by examiner

Object Component Type: Object
Example: Account

[ Account ▲▼ ]

Expand ALL | Collapse All | Clear Cache 👆

📂 Attributes
    > activateable: false
    > compactLayoutable: true
    > createable: true
    > custom: false
    > customSetting: false
    > deletable: true
    > deprecatedAndHidden: false
    > feedEnabled: true
    > keyprefix: 001
    > label: Account
    > labelPlural: Accounts
    > layoutable: true
    > mergeable: true
    > name: Account
    > queryable: true
    > replicateable: true
    > retrieveable: true
    > searchLayoutable: true
    > searchable: true
    > triggerable: true
    > undeletable: true
    > updateable: true
    >urlDetail: https://na15.salesforce.com/{ID}
    >urlEdit: https://na15.salesforce.com/{ID}/e
    >urlNew: https://na15.salesforce.com/001/e
📁 Child Relationships (37)
📁 Fields (56)
📁 Record Type Infos (1)

FIG. 3

Component Detail　　　[Edit] [Delete] [Clone]

Component Name  Account　　　　Parent Component
　　　Type  Object　　　　　　　Deleted ☐

▼ Deployment Steps
　　Pre Deployment Steps
　　Post Deployment Steps

▼ System Information
　　Created By  xxx xxxx  xxxxxxxxxx　　Last Modified By  xxx xxxx  xxxxxxxxxx

[Edit] [Delete] [Clone]

📎 Child Components　　　　　[New Component]　　　　　　　　　Child Components

| Action | Component Name | Type | Created Date | Last Modified By |
|---|---|---|---|---|
| Edit \| Del | Main Phone Number c | Field | xxxxxxxx | xxx xxxx xxxxxxxx xxxx xx |
| Edit \| Del | Do Not Call c | Field | xxxxxxxx | xxx xxxx xxxxxxxx xxxx xx |
| Edit \| Del | Removes Account Main Phone Number | Workflow Field Update | xxxxxxxx | xxx xxxx xxxxxxxx xxxx xx |
| Edit \| Del | Do Not Call Remove Main Phone Number | Workflow Rule | xxxxxxxx | xxx xxxx xxxxxxxx xxxx xx |

*(Created Date column values: xxxxxxxx for each row)*

FIG. 5

ANALYZING COMPONENTS RELATED TO A SOFTWARE APPLICATION IN A SOFTWARE DEVELOPMENT ENVIRONMENT

CROSS-REFERENCE TO RELATED APPLICATIONS

This application is a continuation of U.S. patent application Ser. No. 14/573,497 filed Dec. 17, 2014, which claims the benefit of U.S. Provisional Patent Application No. 61/951,101 filed Mar. 11, 2014 and U.S. Provisional Patent Application No. 62/064,891 filed Oct. 16, 2014. The entire disclosures of the above applications are incorporated herein by reference.

FIELD

The present disclosure relates to methods and systems for analyzing components related to a software application in a software development environment.

BACKGROUND

This section provides background information related to the present disclosure which is not necessarily prior art.

Software developers oftentimes use a software development environment to develop software applications. Some software development environments can be cloud based. More than one software developer may be working in the software development environment at the same time. The software application may consist of one or more components. Each component may have attribute information specific to the component, and may have relationships to other components.

SUMMARY

This section provides a general summary of the disclosure, and is not a comprehensive disclosure of its full scope or all of its features.

According to one aspect of the present disclosure, a process for analyzing components related to a software application in a software development environment is disclosed. The process includes obtaining metadata information for each of a plurality of components from the software development environment, and generating an entry including extracting attribute information from the obtained metadata information for each component for use by a developer of the software application.

According to another aspect of the present disclosure, a computer system for analyzing components of a software applicant in a software development environment includes at least one processor, memory, and software stored in memory. The software is operable to cause the processor to obtain metadata information for each of a plurality of components from the software development environment. The software is also operable to cause the processor to generate an entry including extracting attribute information from the obtained metadata information for each component for use by a developer of the software application.

According to yet another aspect of the present disclosure, a non-transitory computer readable medium encoded with computer executable instructions for analyzing components of a software application in a software development environment is disclosed. The set of computer executable instructions includes obtaining metadata information for each of a plurality of components from the software development environment, and generating an entry including extracting attribute information from the obtained metadata information for each component for use by a developer of the software application.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a list of attributes for an example object component according to another aspect of the present disclosure.

FIG. 5 is a user interface illustrating relationship information related to an example component according to another example aspect of the present disclosure.

DETAILED DESCRIPTION

Figure 1:
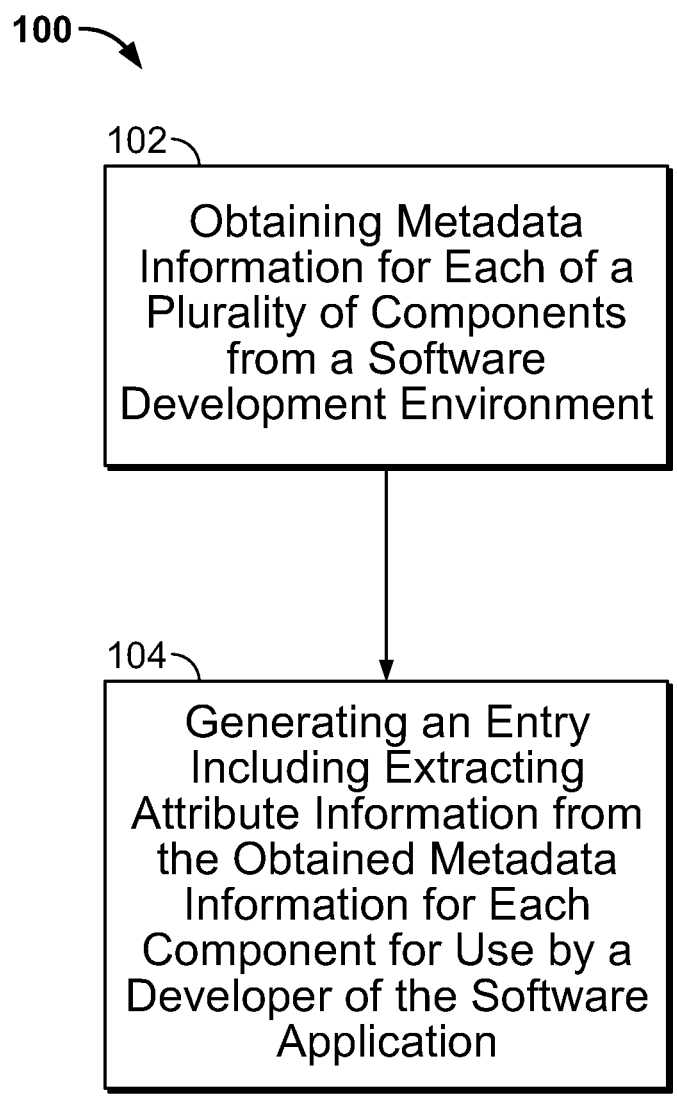
FIG. 1 is a block diagram of a process for analyzing components of a software application in a software development environment according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, a process for analyzing components related to a software application in a software development environment is disclosed. The process includes obtaining metadata information for each of a plurality of components from the software development environment, and generating an entry including extracting attribute information from the obtained metadata information for each component for use by a developer of the software application.

The example process may be used by developers to see how a component is being used in the system to assess the ripple effect from changing a component, and may provide transparency to see how other developers are customizing components in the same environment. This may result in an increase in development speed as it allows developers to develop better testing plans and reduce the impact of changes.

The software development environment may be any environment suitable for one or more users to develop a software application, such as, for example, a cloud computing environment, cloud based platform, premise based platform, local desktop, workstation, virtual machine, development server, sandbox environment, etc. In some example embodiments, the software development environment may be a SALESFORCE® platform created by Salesforce.com Inc. of San Francisco, Calif.

The software application may be any suitable software application having one or more components such as, for example, a customer relationship management (CRM) application, an application lifecycle management (ALM) application, etc. In some example embodiments, the software application may be a CRM application developed on the SALESFORCE® platform. As used herein, software may include, without limitation, computer readable instructions, data structures, program modules, other data, etc., which may be stored in memory (e.g., a non-transitory computer readable media), and software developer may include, without limitation, any user who creates software code, edits software, tests software, manages and/or supervises software development, etc.

Figure 2:
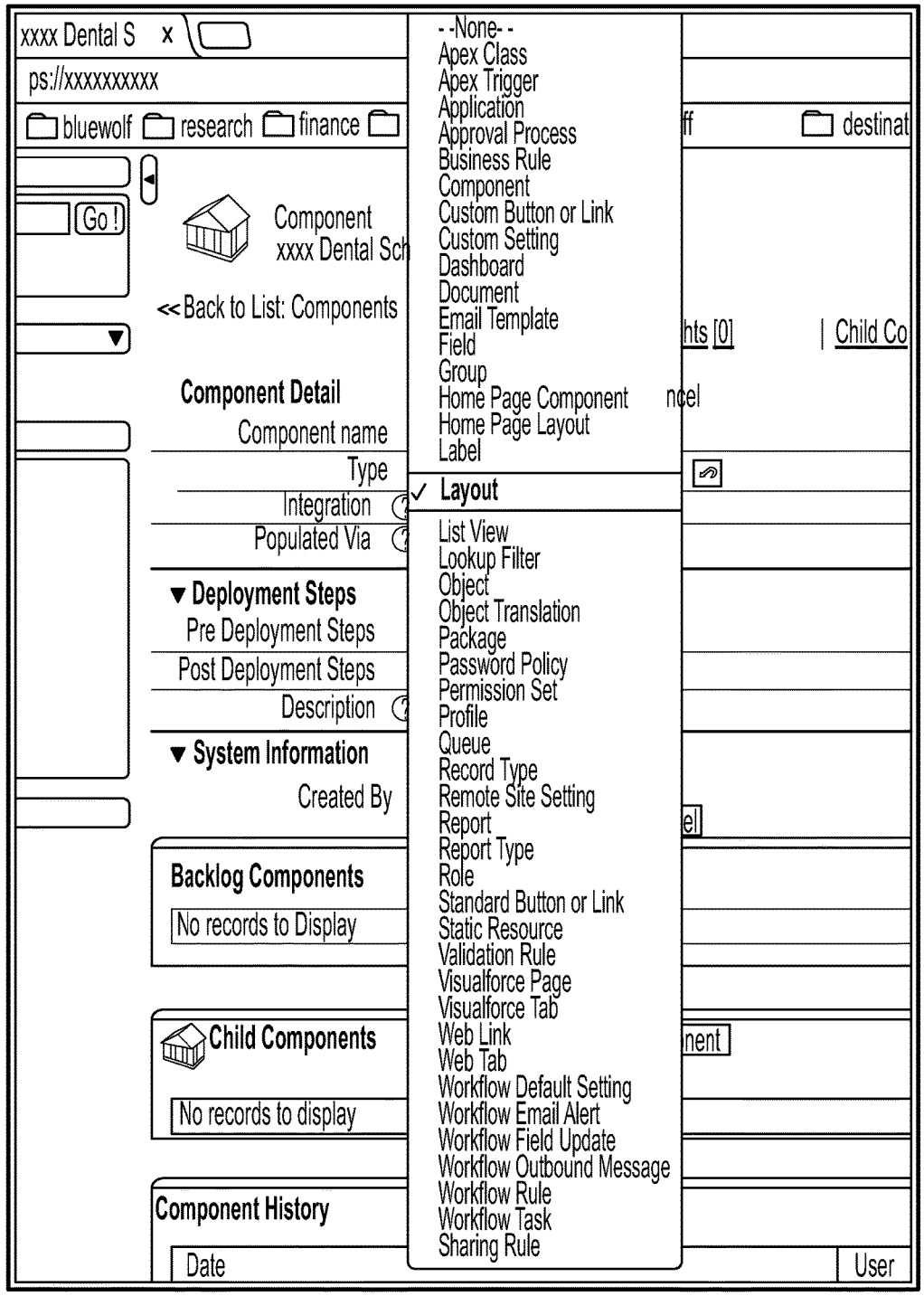
FIG. 2 is an example list of component types according to an aspect of the present disclosure.

A component may be any module, template, customizable element, etc. for performing one or more related functions, having one or more data fields, etc. Components may be grouped into component types, with each component type defining its functions, data fields, etc., and different component types performing different functions, having different data fields, etc. Each component may be an instance of one or more component types, but may be uniquely identified and have different values from other components of a similar type. As illustrated in FIG. 2, example component types may include business rules, buttons, links, custom settings, documents, email templates, fields, groups, labels, layouts, list views, filters, objects, passwords, permissions, profiles, queues, records, reports, validation rules, tabs, workflows, etc. Although FIG. 2 shows a specific set of component type options, it should be understood that other example embodiments may include more, less, or different component types. In one example embodiment, the component types are defined by the SALESFORCE® platform with each component type having the same data structure, but different values for unique components sharing the same component type.

A component may include one or more attributes such as, for example, data fields providing information about the component. FIG. 3 illustrates an example Account component having an Object component type. As shown, the Account component has multiple attributes, with each attribute having a value.

The attributes belonging to a component may be defined by the component type, but each component may have its own unique attribute values. For example, an Account component and a Hidden_Account component may each have an 'object' component type. Object components may have attributes such as whether the component is createable, custom, deleteable, searchable, updateable, etc. In this example, the Account component and Hidden_Account component may have the same values for their creatable, custom, deleteable, and updateable attributes, but different searchable attribute values. For example, the Account component may have a 'true' value for its searchable attribute, while the Hidden_Account may have a 'false' value for its searchable attribute.

The metadata information may include any suitable information about a component, such as, for example, attributes, relationships to other components, fields, parameters, values, names, data, etc.

The metadata information may be obtained from the software development environment using any suitable method(s) such as, for example, using a communication library to communicate with the software development environment to retrieve metadata information for each component. In one example embodiment, a SALESFORCE® communication library may be used to handle simple object access protocol (SOAP) messages using the SALESFORCE® application programming interface (API). In other embodiments, metadata information may be obtained from the software development environment using screen scraping, web crawling, etc.

Figure 4:
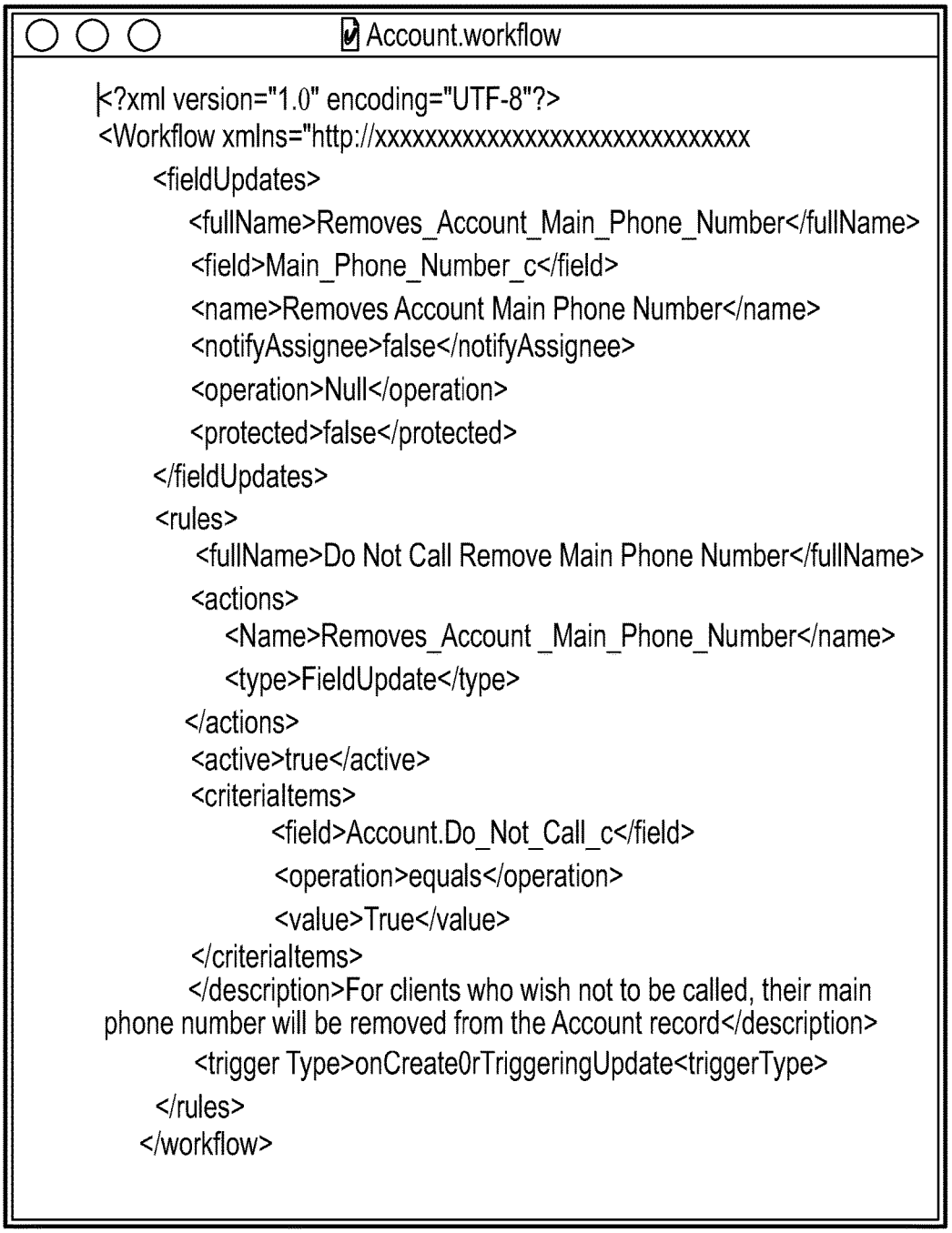
FIG. 4 is a portion of XML code illustrating metadata for an example component according to another aspect of the present disclosure.

The metadata information may be retrieved in any suitable format, such as, for example, an extensible markup language (XML) format, a standardized generalized markup language (SGML) format, etc. FIG. 4 illustrates example metadata information in an XML format for an example Account component having a workflow component type.

In one example embodiment, a properties file may be read to provide credentials for connection to a SALESFORCE® application development platform. A SALESFORCE® metadata API connection may be initiated. An XML file may be created for all components that will be retrieved from the platform. A retrieve metadata API function call may be executed for all of the components, and the API may be checked for completion of the function call in configured intervals. A check for errors may also be performed. The returned API response may be saved as a zip file in a local folder, and the file may be unzipped to extract the XML files for each component.

The extracted attribute information may include relationship information related to one or more relationships for each component to other components of the software application such as, for example, a parent relationship to another component(s), a child relationship to another component(s), a generic relationship to another component, etc. Relationship information may include a reference from one component to another. As an example shown in FIG. 5, an Account object component could be a parent component that may have child components such as fields, workflow field updates, workflow rules, etc.

In further examples, a field component could be a child of an object component. A workflow component may also be a child of an object component. While some components may have parent components, others may not. For example, an email template component may not have a parent component. While some parent-child relationships may be required, other relationships between components may be optional. For example, a relationship between a field component and an email component may not be required, but they could still reference each other optionally. The field component may reference the email template component to cause the email template component to include the field component every time an email is sent out. Similarly, an Account object component may have a secondary zip code field, and a relationship to an email alert component may cause the email alert to send an email each time the secondary zip code field of the account object is updated. A component list of entries may help developers to track relationships between components in the development environment. If two developers are working on the same portion of the software application, they can each use the report to avoid interfering with each other.

Generating an entry (e.g., a generic entry, a record entry, a SALESFORCE® record entry, etc.) may include generating a plurality of parseable objects for the components using the metadata information. A library may be used to convert software component files of the development environment comprising an XML coding language format into a class-based, object-oriented coding language format. For example, a library may be used to convert XML files to Java objects by parsing metadata information from a SALESFORCE® platform to get attributes for each component. Alternatively, other suitable coding languages and formats may be used to parse the metadata information.

XML files for each component may be converted to Java objects by reading each XML file using a Java Architecture for XML Binding (JAXB) library. The metadata information about each component may be converted to a parseable object using one of a plurality of object classes associated with each component type. There may be classes that represent each type of component and the attributes belonging to each component to simplify the interaction and parsing of the attributes. Alternatively, or additionally, an abstract class may be used to parse all component types. Each XML file may be converted to a corresponding Java class, and an instance of each XML file may be instantiated as a Java object.

Each object may be parsed to extract attribute information for each component. A utility class may parse each component class and return all attributes. In one example embodiment, the Java objects may be parsed into entries suitable for sending back to a SALESFORCE® platform. Each Java object may execute a method of self-parsing, such that each Java object may be capable of self-examination to determine its own attribute information. A generic record class may be used so that data can be stored from the component classes to be sent to the software development environment. A Java record object may be created that contains all the attributes of each Java object. All attribute values may be set into the Java record object. This process may be repeated for each XML file.

Figure 6:
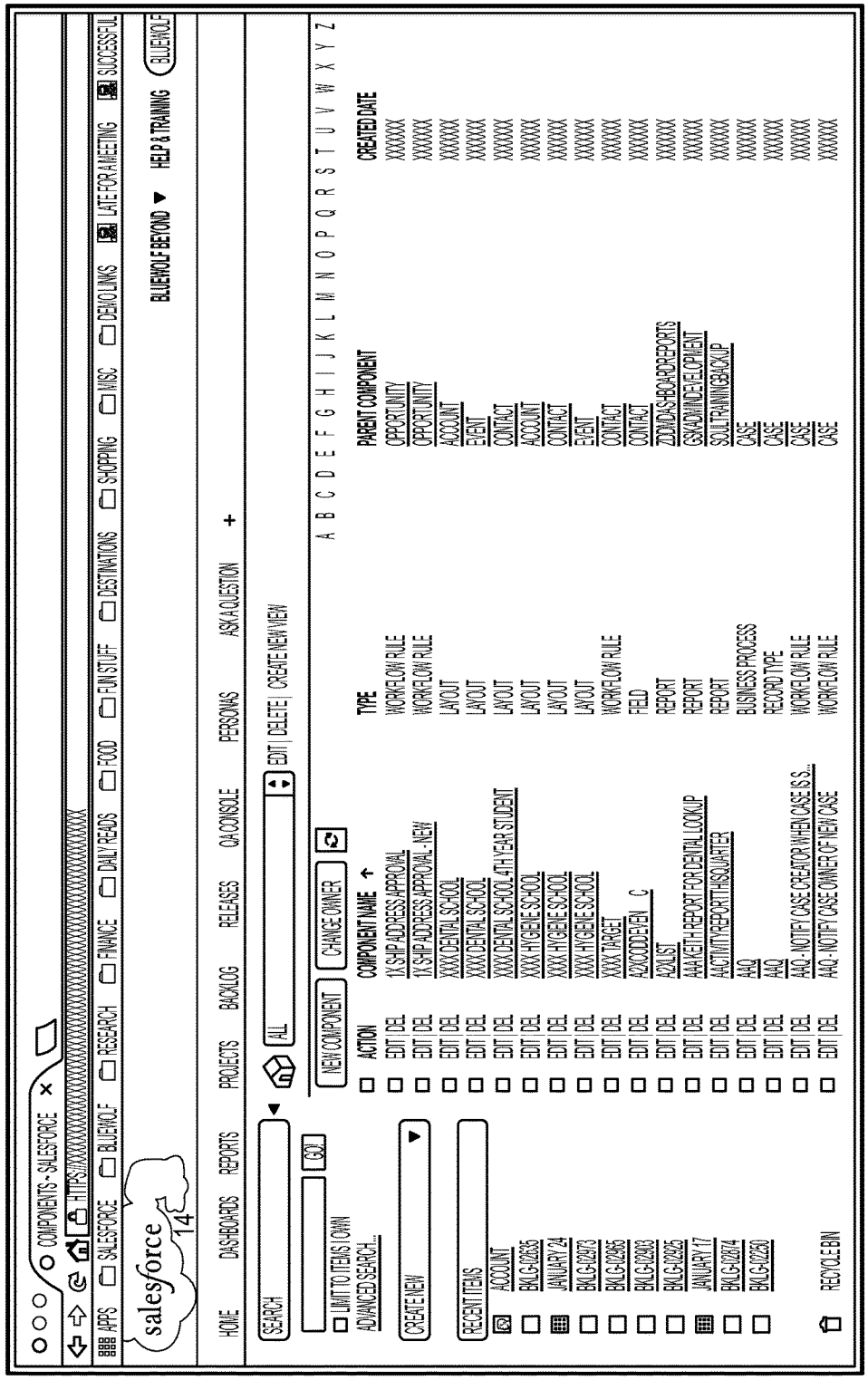
FIG. 6 is a user interface illustrating an example component list according to another aspect of the present disclosure.

A component list may be sent to a user interface of the software development environment. The list may include an entry for each component, as shown in example FIG. 6. The component list may be formatted to allow a developer to display and manipulate the attribute information related to each component. Additionally, or alternatively, the component list may be formatted to allow a developer to display and manipulate relationship information related to each component. The component list may allow developers to view the list to see information about relationships and attributes of each component. In some example embodiments, the developers may not be able to make any changes to component attribute information or relationship information while viewing the list. Other example embodiments may allow developers to make changes while viewing the list.

In one example embodiment, entries may be inserted into a SALESFORCE® platform. A connection may be initiated to a SALESFORCE® instance where a user interface (UI) has been installed. An entry may be inserted to the platform UI for each Java object that represents an XML file. This may be repeated until all entries have been inserted to the platform.

A user interface, client application, etc., may be used to display and manipulate the data generated using the above example synchronization process. In one example embodiment, the user interface, client application, etc., may be generated using components of the SALESFORCE® platform. A custom object may be used to store all data displayed in the user interface. The object may have a look up field to itself to support parent-child relationships and relationships from one component to another. The object may have a look up to any other SALESFORCE® object that may require component documentation capabilities.

A logging class may be used to output application execution and errors. The logging class may be used for error trace-ability and error management.

Figure 7:
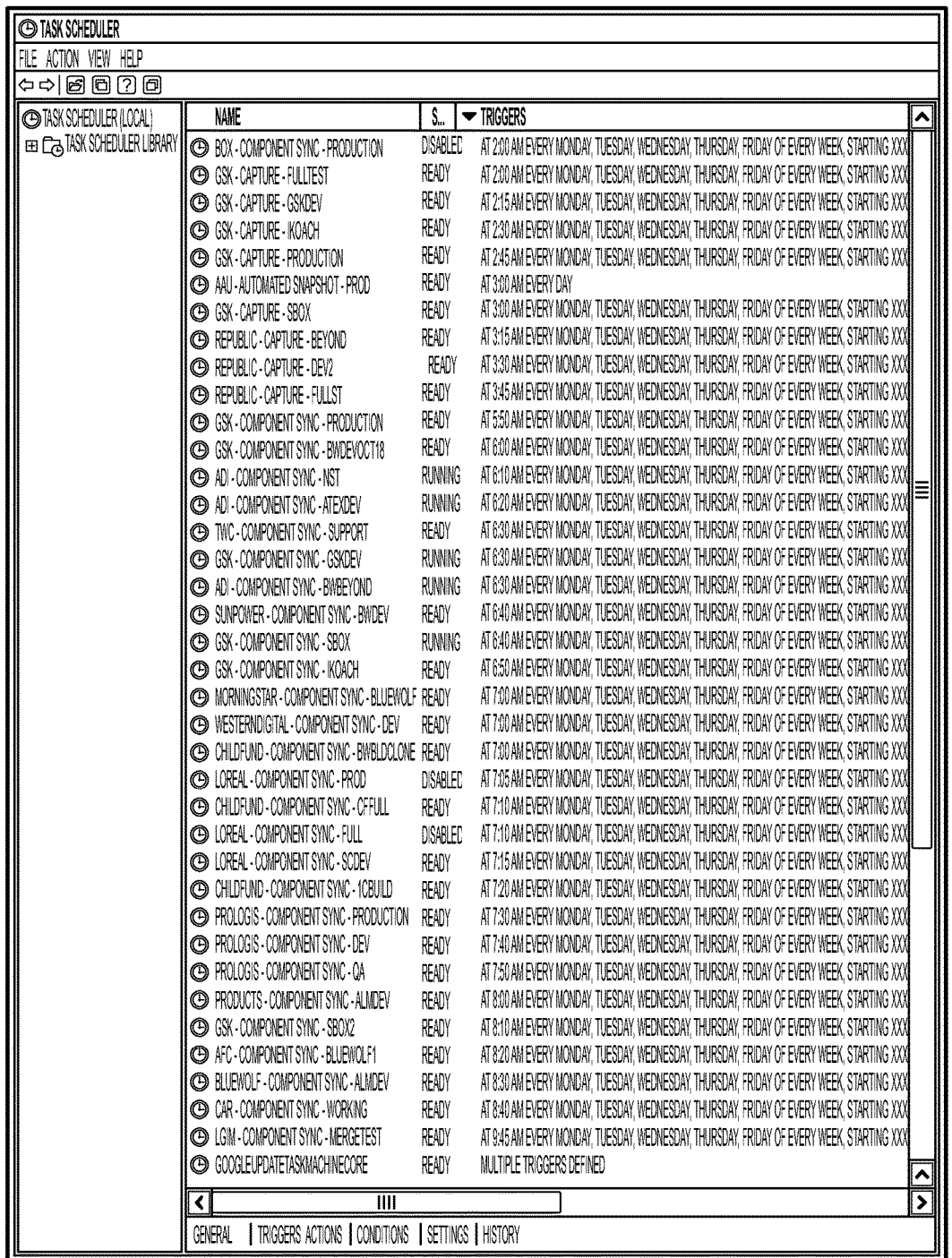
FIG. 7 is a user interface illustrating repeat periodic scheduling for example component lists according to another aspect of the present disclosure.

The above process may be repeated periodically. The process may be repeated on a scheduled periodic basis to update the component list. For example, the process may be repeated each night so that the component list is updated daily. Shorter or longer periods may be used instead, such as, for example, every thirty minutes, weekly, etc. FIG. 7 illustrates example repeat scheduling periods for different component lists.

An example case of the above processes will now be described in further detail. A software application being developed on a SALESFORCE® cloud platform may include an Account component having an object component type. The Account may have four child components: a Main_Phone_Number component having a field component type, a Do_Not_Call component having a field component type, a Removes_Account_Main_Phone_Number component having a workflow field update component type, and a Do_Not_Call_Remove_Main_Phone_Number component having a workflow rule component type.

A component synchronization tool application may initiate a connection to the SALESFORCE® platform and retrieve metadata information using a retrieve( ) API call to retrieve XML files for each component. The Account component XML file may list attributes and relationship information about the Account component. The Main_Phone_Number component XML file may list attributes and relationship information about the Main_Phone_Number component. The attribute structure of the Account component may be defined by the SALESFORCE® object component type and the attribute structure of the Main_Phone_Number component may be defined by the SALESFORCE® field component type. Because the Main_Phone_Number component and the Do_Not_Call component both have a field component type, their attribute structure may be the same, but the values assigned to each attribute may be different. For example, the field component type may be defined by SALESFORCE® to have a label attribute, a description attribute, and a default value attribute. The Main_Phone_Number may have a label attribute value of "Main Phone Number" and a description attribute value of "Main phone number for accounts." The Do_Not_Call component may have a label attribute value of "Do Not Call" and a description value of "For accounts who do not wish to be contacted via phone." Both the Main_Phone_Number component and the Do_Not_Call component may have a value of "false" for the default value attribute.

The XML file for each component may be read using a JAXB library and converted to a corresponding Java class. An instance of each XML file may be instantiated as a Java object. For example, the Account component XML file may be read and an Account Java object may be created using a class for object component types. The Main_Phone_Number component XML file may then be read and a Main_Phone_Number Java object may be created using a class for field component types. Each Java object may be parsed to obtain the attribute values and relationship information. These values may be stored in a generic record Java object. This process may be repeated for each XML file.

A component list may then be sent to a user interface of the SALESFORCE® platform. The user interface may be the same instance of the SALESFORCE® platform from which the component XML files were retrieved, or may be a different instance. The component sync tool application may connect to the user interface and insert an entry for every Java object representing an XML file component. This may be repeated until all entries have been created. Once the component list has been sent to the user interface, a developer may use the user interface to display and manipulate the attribute and relationship information for all components in the software application of the software development environment.

For example, the developer may use the user interface to select the Account component and display attribute information such as its object component type and its relationship information, including its child components Main_Phone_Number, Do_Not_Call, Removes_Account_Main_Phone_Number, and Do_Not_Call_Remove_Main_Phone_Number. The developer may also search for component to component relationship results such as, for example, relationships between the Main_Phone_Number (i.e., Field) component, the Removes_Account_Main_ Phone_Number (i.e., WorkflowFieldUpdate) component, and the Do_Not_Call_Remove_Main_Phone_Number (i.e., Workflow Rule) component.

Figure 8:
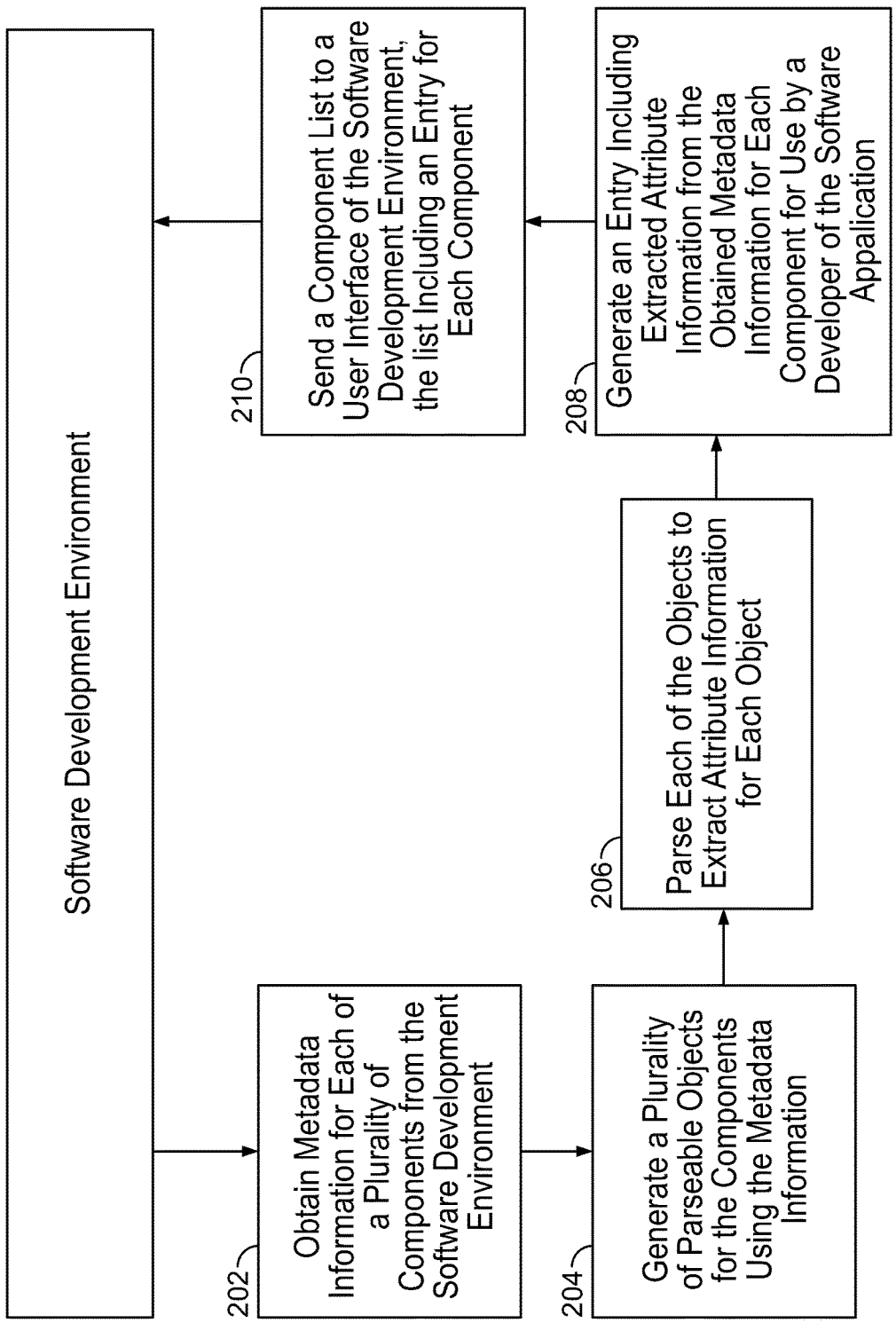
FIG. 8 is a block diagram of a process for analyzing components of a software application according to another example embodiment of the present disclosure.

According to another example embodiment of the present disclosure, a process for analyzing components related to a software application in a software development environment is illustrated in FIG. 8. At 202, the process includes obtaining metadata information for each of a plurality of components from the software development environment. At 204, the process includes generating a plurality of parseable objects for the components using the metadata information. At 206, the process includes parsing each of the objects to extract attribute information for each object. At 208, the process includes generating an entry including extracted attribute information from the obtained metadata information for each component for use by a developer of the software application. At 210, the process includes sending a component list to a user interface of the software development environment, the list including an entry for each component.

Figure 9:
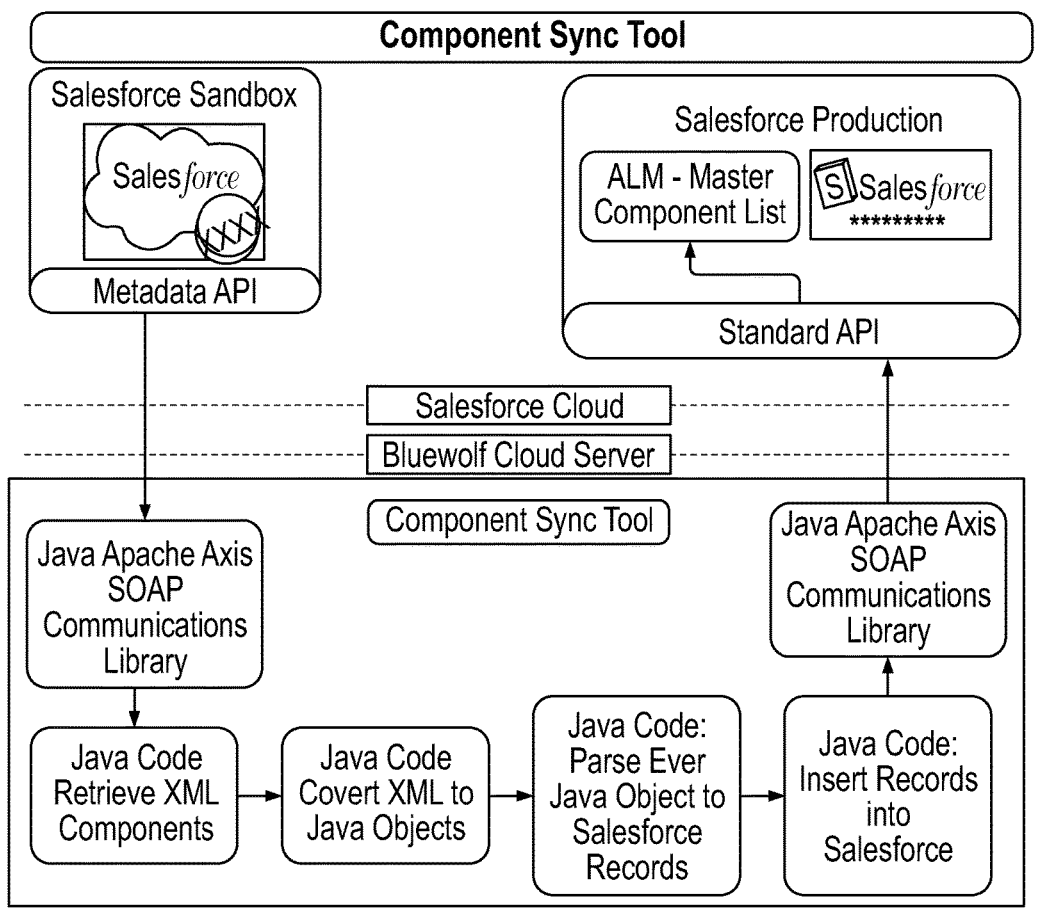
FIG. 9 is a block diagram of an example process for analyzing software components in a SALESFORCE® development environment according to yet another example embodiment of the present disclosure.

FIG. 9 illustrates another example embodiment of the present disclosure. In this example embodiment, the SALESFORCE® sandbox development platform resides on a SALESFORCE® cloud. A metadata API is used to obtain metadata at a Component Sync Tool (i.e., a software application on a remote cloud server). The metadata API is obtained using a Java Apache Axis SOAP Communications Library. Java code is used to retrieve XML components, and then convert the XML to Java objects. The Java code parses every Java object into a SALESFORCE® record. Java code is then used to insert the records into a SALESFORCE® production platform on the SALESFORCE® cloud using a standard API and the Java Apache Axis SOAP Communications Library. The records form an ALM master component list.

Figure 10:
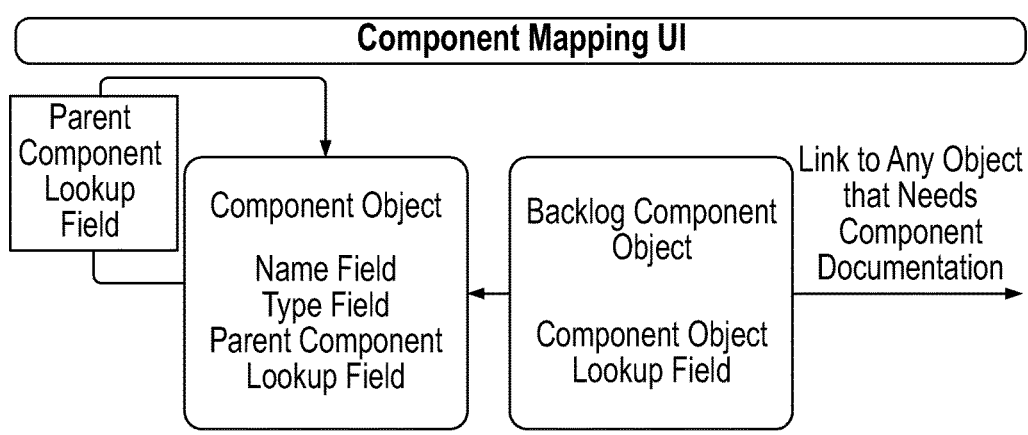
FIG. 10 is a user interface for allowing users to view component information according to another aspect of the present disclosure.

FIG. 10 illustrates an example user interface for component mapping, according to another aspect of the present disclosure. The user interface may be used by developers to display and manipulate data related to components. In this example embodiment, each component may include a name field, a type field, a parent component, and a lookup field. The parent lookup field may point to a parent component. The component may also include a look up filed to itself to support parent-child relationships and relationships from one component to another. A backlog component object includes a component object field, which points to a component object, and also may link to any object that may need component documentation.

Figure 11:
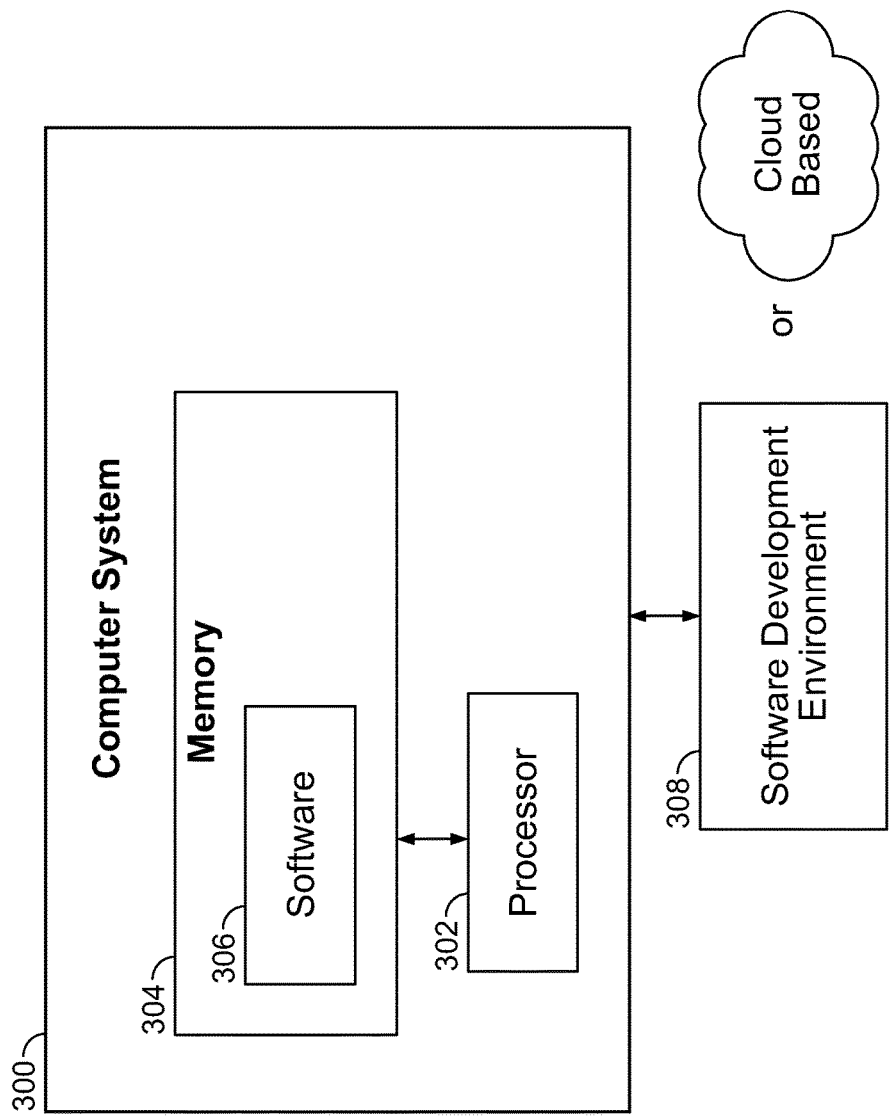
FIG. 11 is a block diagram of an example computer system according to another aspect of the present disclosure.

FIG. 11 illustrates an example computer system 300 for analyzing components in a software development environment 308. The computer system 300 includes at least one processor 302, memory 304, and software 306 stored in memory. The software 306 is operable to cause the processor 302 to obtain metadata information for each of a plurality of components from the software development environment 308. The software 306 is also operable to cause the processor 202 to generate an entry including extracting attribute information from the obtained metadata information for each component for use by a developer of the software application.

It should be understood that computer system 300 is only one example of a suitable computer system and is not intended to suggest any limitation as to the scope of use or functionality of the present disclosure. The computer system 300 should not be interpreted as having any dependency or requirement relating to any component or combination of components illustrated in the example computer system 300. The present disclosure may be operational with any suitable general purpose or special purpose computing system environment or configuration. For example, the computer system 300 may be implemented using personal computers, laptop computers, server computers, network computers, minicomputers, mainframe computers, hand-held devices, multiprocessor systems, microprocessor-based systems, set top boxes, programmable consumer electronics, cloud platforms, distributed computing environments that include any of the above systems or devices, etc.

The present disclosure may include aspects of computer-executable instructions, such as program modules, that may be executed by a computer. Program modules may include routines, programs, objects, components, data structures, etc., that may perform particular tasks or implement particular abstract data types. The present disclosure may include a distributed computing environment where some processes may be performed by remote processing devices that may be linked through a communications network. Program modules may be located in both local and remote computer storage media including memory storage devices.

The system 300 may be implemented using a single processor 302, multiple processors on a single system, multiple processors across systems that may be in a local or distributed system, etc. A system bus may be used to couple components of the system 300 to the processor 302, such as the memory 304. The bus may be any suitable bus architecture such as a memory bus, memory controller, peripheral bus, local bus, Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Mezzanine bus, etc.

The memory 304 may be memory located on a single computer, a server, shared between multiple systems, etc. The memory 304 may be located within the same system as one or more of the processors 302 (including onboard memory in the processors), or may be located externally. The memory 304 may comprise volatile memory, nonvolatile memory, ROM, RAM, one or more hard disks, magnetic disk drives, optical disk drives, removable memory, non-removable memory, magnetic tape cassettes, flash memory cards, digital video disks (DVDs), cloud storage, etc.

The computer system 300 may include non-transitory computer readable media, which may be any suitable media capable of being accessed by the system 300, and may include volatile media, nonvolatile media, removeable media, non-removable media, RAM, ROM, EEPROM, flash memory, CD-ROM, DVD, optical disk storage, magnetic cassettes, magnetic tape, magnetic disk storage, etc.

The software 306 may be stored in any suitable location in the memory 304 and may or may not be stored in the same memory. The software 306 may be stored in memory 304 on a single computer, a server, may be shared between multiple systems, etc. The memory 304 and/or non-transitory computer readable media may provide storage of software 306, which may include computer readable instructions, data structures, program modules, other data, etc. The memory 304 and/or computer readable media may store operating systems, application programs, other program modules, program data, etc.

Users may enter input commands and/or information into the computer system 300 through input devices such as a keyboard, pointing device, mouse, trackball, touch pad, microphone, joystick, game pad, satellite dish, scanner, etc. The computer system 300 may include output devices such as a display device, monitor, speakers, printer, etc.

The computer system 300 may operate in a networked environment using logical connections to one or more remote computers, such as a personal computer, server, router, network computer, etc. The logical connections may include a wired network and/or wireless network. The logical connections may include a local area network (LAN) (e.g., office network) or a wide area network (WAN) (e.g., the Internet). When used in a LAN working environment, the computer system 300 may be connected to the LAN through a network interface, adapter, etc. When used in a WAN network, the computer system may be connected to the WAN through a modem, wireless network adapter, etc.

The software development environment 308 may be separate from the computer system 300 as shown in FIG. 2 (and may reside in a cloud based development platform). Alternatively, the software development environment 308 may be part of the computer system 300. In one example embodiment, the software development environment 308 may be a SALESFORCE® platform located on a cloud server, while the computer system 200 may be located separately from the software development environment. The computer system 300 may retrieve information from the SALESFORCE® platform and generate entries to send to the SALESFORCE® platform.

According to another example embodiment, a non-transitory computer readable medium is encoded with computer executable instructions for analyzing components of a software application in a software development system. The set of computer executable instructions includes obtaining metadata information for each of a plurality of components from the software development environment, and generating an entry including extracting attribute information from the obtained metadata information for each component for use by a developer of the software application.

According to another example embodiment of the present disclosure, a user interface may be built on a SALESFORCE® platform that may allow customers to view component mappings to application features and other components. A master list may be generated showing all the components for documentation.

A Java application may be built and configured with credentials to connect to a source software development environment where the components are being modified, and to connect to a target environment where a UI application has been installed. The source and target development environments may or may not be the same environment. A parsing engine may, on a scheduled basis, connect to the SALESFORCE® environment through a metadata API using a communications framework. A retrieve API call may be used to extract components from the environment locally in XML files. The XML files may be converted to Java class objects, which may be used by a parsing engine. The parsing engine may extract all components and their subcomponents to create an entry in the application's master component list. This may allow customers to document the individual components to function(s) of those components.

Some of the example embodiments may provide one or more advantages, such as, for example, documentation for compliance or regulatory rules, impact analysis to see how a component is being used in the system to assess the ripple effect from changing a component, transparency to see how other developers may be customizing components in the same environment, and an increase in development speed because, by understanding object dependencies, developers can develop better testing plans and reduce the impact of changes. It may be possible to view how a component is being used functionally in an environment, and how components are being used by other components in the system. Some example embodiments may provide analysis of an environment for customized components and a parsing engine for each component to map references to other components. Some example embodiments may analyze multiple production environments, quality assurance (QA) environments, development environments, etc. for a manifest of all the components in a system for mapping and documentation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A computer-implemented process for analyzing components related to a software application in a software development environment, the process comprising:
   obtaining metadata information for each of a plurality of components from a software development environment;
   converting the metadata information for each component into a parseable object using one of a plurality of object classes each associated with a corresponding component type;
   parsing each of the objects to extract attribute information for each component; and
   generating an entry for each of the plurality of components, said entry including extracted attribute information from the obtained metadata information for said component and viewable by a developer of the software application,
   wherein each parseable object is a self-parsing object capable of determining its own attribute information.

2. The process of claim 1, further comprising sending a component list to a user interface of the software development environment, the list including an entry for each component.

3. The process of claim 1, wherein the software development environment is a development environment for customer relationship management applications.

4. The process of claim 1, wherein the software development environment resides in a cloud computing environment.

5. The process of claim 1, further comprising repeating the process on a scheduled periodic basis to update the list periodically.

6. The process of claim 1, wherein obtaining includes using a communication library to communicate with the software development environment to retrieve metadata information for each component.

7. The process of claim 1, wherein converting includes using a library to convert software component files of the development environment comprising an extensible markup language coding language format into a class-based, object-oriented coding language format.

8. The process of claim 1, wherein the extracted attribute information includes relationship information related to one or more relationships for each component to other components of the software application.

9. The process of claim 1, wherein generating an entry includes generating a component list having an entry for each component, the component list formatted to allow a developer to display and manipulate the attribute information related to each component.

10. The process of claim 8, wherein generating an entry includes generating a component list having an entry for each component, the component list formatted to allow a developer to display and manipulate relationship information related to each component.

11. A computer system for analyzing components related to a software application in a software development environment, the computer system comprising:
   at least one processor;
   memory storing computer executable instructions, the instructions executable by the processor to cause the processor to:
   obtain metadata information for each of a plurality of components from the software development environment by using a communication library to communicate with the software development environment to retrieve metadata information for each of the plurality of components;
   generate a plurality of parseable objects for the components using the metadata information;
   parse each of the objects to extract attribute information for each component; and
   generate an entry for each of the plurality of components, said entry including extracted attribute information from the obtained metadata information for said component and viewable by a developer of the software application,
   wherein each parseable object is a self-parsing object capable of determining its own attribute information.

12. A non-transitory computer readable medium encoded with computer executable instructions for analyzing components of a software application in a software development system, the set of computer executable instructions executable by a processor to cause the processor to perform a method comprising:
   obtaining metadata information for each of a plurality of components from the software development environment;
   generating a plurality of parseable objects for the components using the metadata information;

parsing each of the objects to extract attribute information for each component;

generating an entry for each of the plurality of components, said entry including extracted attribute information from the obtained metadata information for each component and viewable by a developer of the software application; and inserting each entry into a platform user interface of the software development environment to create a master component list to document function(s) of each of the plurality of components from the software development environment, wherein each parseable object is a self-parsing object capable of determining its own attribute information.

13. The process of claim 1, further comprising inserting each entry into a platform user interface of the software development environment to create a master component list to document function(s) of each of the plurality of components from the software development environment.

14. The process of claim 1, wherein generating an entry includes generating a SALESFORCE record entry.

15. The process of claim 1, wherein obtaining metadata information includes obtaining metadata information from the software development environment using screen scraping and/or web crawling.

16. The system of claim 11, wherein the instructions are executable by the processor to cause the processor to retrieve metadata information for each of the plurality of components by executing a retrieve metadata API call for each of the plurality of components to generate a metadata file for each of the plurality of components.

17. The system of claim 11, wherein the instructions are further executable by the processor to cause the processor to insert each entry into a platform user interface of the software development environment to create a master component list to document function(s) of each of the plurality of components from the software development environment.

* * * * *